United States Patent

Niskin

[11] 4,026,148
[45] May 31, 1977

[54] WATER FLOW METER

[76] Inventor: Shale J. Niskin, 2941 Lucaya, Coconut Grove, Fla. 33133

[22] Filed: Apr. 16, 1976

[21] Appl. No.: 677,830

[52] U.S. Cl. .............................. 73/185; 73/272 R
[51] Int. Cl.² ...................................... G01C 21/10
[58] Field of Search ............ 73/185, 187, 393, 497, 73/229, 230, 231 R, 231 M, 272

[56] References Cited

UNITED STATES PATENTS

| | | | |
|---|---|---|---|
| 1,421,405 | 7/1922 | Chernikeeff | 73/185 |
| 1,495,010 | 1/1977 | Ford | 73/272 R |
| 3,001,407 | 9/1961 | Wiancko et al. | 73/497 |
| 3,104,552 | 9/1963 | Bouchard | 73/497 |

Primary Examiner—Donald O. Woodiel
Attorney, Agent, or Firm—Salvatore G. Militana

[57] ABSTRACT

A water flow meter having a hollow housing adapted to contain counter mechanism, a propeller shaft extending into the housing, a hollow propeller hub mounted on the free end of the shaft, an opening in the hub, a bore extending through the shaft from the hub to the housing, a flexible diaphragm extending over the bore in the hub adapted to contain a liquid lubricant capable of flowing to and from the housing effected by changes in temperature and pressure and seal means mounted on the housing and extending about the shaft preventing the ingress of water therethrough.

4 Claims, 5 Drawing Figures

WATER FLOW METER

BACKGROUND OF THE INVENTION

1. Field Of The Invention

This invention relates to water flow meters and is more particularly directed to prevent the loss of oil and seepage of water into the water flow meter due to changes in pressure and temperature.

2. Description Of The Prior Art

In order to maintain the counter mechanism in a conventional water flow meter properly lubricated and to prevent the seepage of water therein, the meter housing is filled with lubricating oil. However, due to temperature and pressure changes subjected onto the water flow meter, the oil contained in the housing will expand and contract. When the oil, with or without air trapped also in the housing, expands there must necessarily be a discharge of excess oil through the seal which normally occurs at the propeller shaft where it leaves the housing. Now when there is a change in pressure and temperature to cause the oil to contract, a partial vacuum will be formed in the housing to cause the higher atmosphere or water pressure to force air or water into the housing until the pressures within and external of the housing are balanced. This exposure of the water flow meter to variations of pressure and temperature causes the device to effect a pumping action whereby oil in the meter housing becomes contaminated with water and air. For this reason, it becomes necessary for the conventional water flow meters to be evacuated of its oil at each use to remove the contaminated oil in order to have a properly operating meter and prevent the deterioration of its counter mechanism. The present invention contemplate avoiding the above indicated objection to the conventional water flow meter by providing a pressure and temperature controlled device within the meter that prevents the loss of oil due to such changes in temperature and pressure to which the water flow meters are normally subjected.

BRIEF SUMMARY OF THE INVENTION

Therefore, a principal object of the present invention is to provide a water flow meter with means in the propeller hub for collecting excess oil in a water flow meter caused by changes in pressure and temperature of the oil in the housing that also contains the counter mechanism whereby a reverse change in temperature and pressure will restore the oil to the housing.

Another object of the present invention is to provide means for preventing oil in a water flow meter from being discharged therefrom upon the meter being subjected to a change in temperature and pressure and the subsequent intake of air or water upon a reverse change in pressure and temperature.

A further object of the present invention is to provide a reservoir of oil within a flexible diaphragm that is exposed to the atmosphere and water when measuring water flow so that as an increase in temperature or lowering of pressure thereon will permit the oil in the housing to expand and flow into the reservoir and a decrease in temperature and increase in pressure will permit the return of the oil from the reservoir to the housing.

A still further object of the present invention is to provide means within a water flow meter that prevents the discharge of oil and intake of water and air into a water flow meter due to variations of pressure and temperature and a knife edge seal about the propeller shaft which is affected by water pressure so as to engage the shaft more firmly with increase in water pressure.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

DETAILED DESCRIPTION OF THE PREFERRED EMBODIMENT

Figure 1:
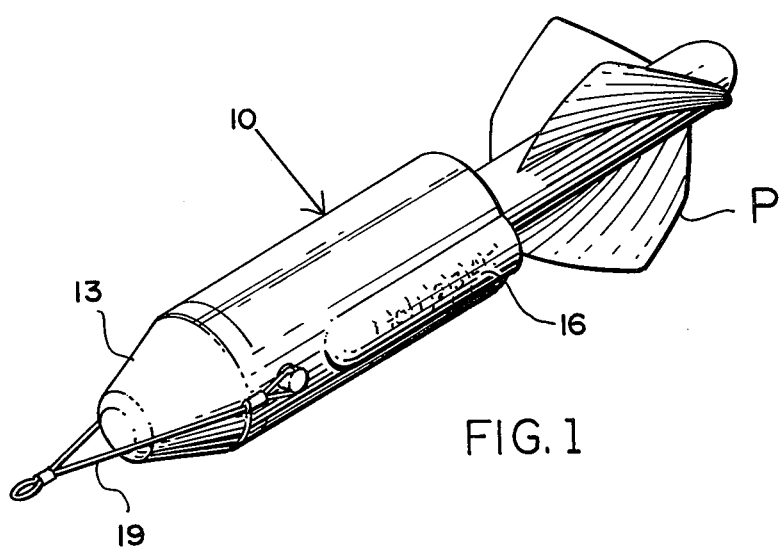
FIG. 1 is a perspective view of a water flow meter constructed in accordance with my invention.
Figure 2:
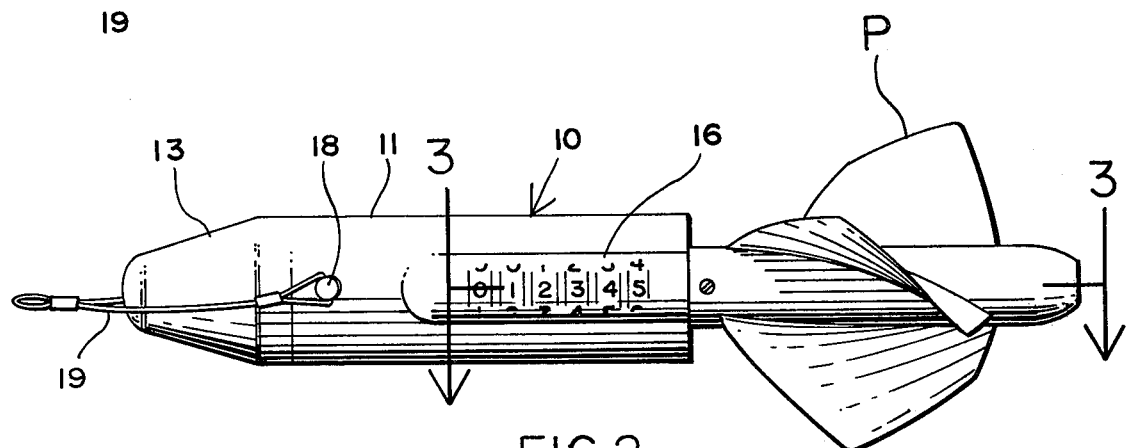
FIG. 2 is a side elevational view.
Figure 3:
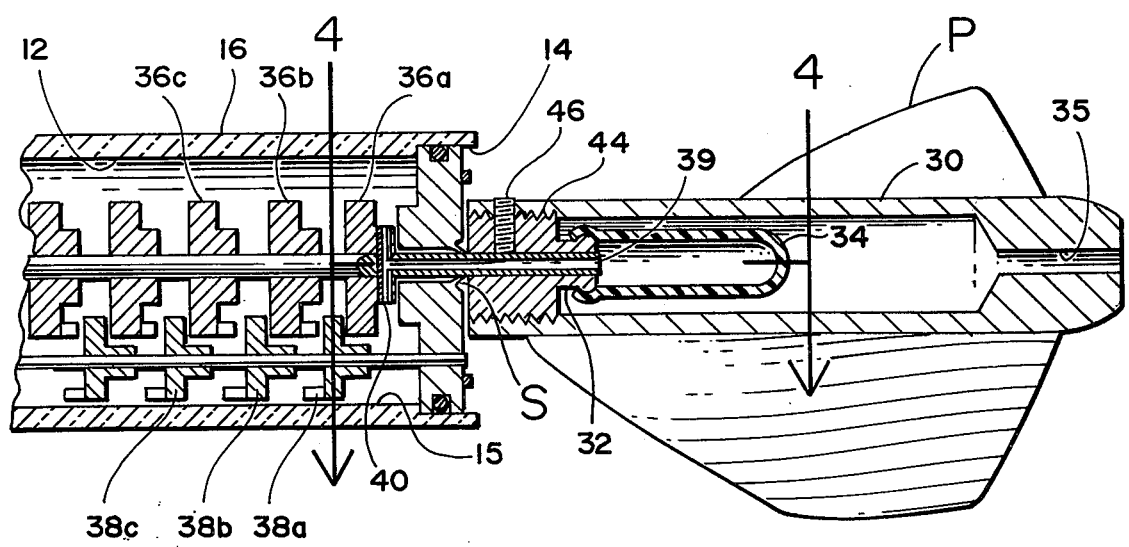
FIG. 3 is a cross sectional view taken along the line 3—3 of FIG. 2.
Figure 4:
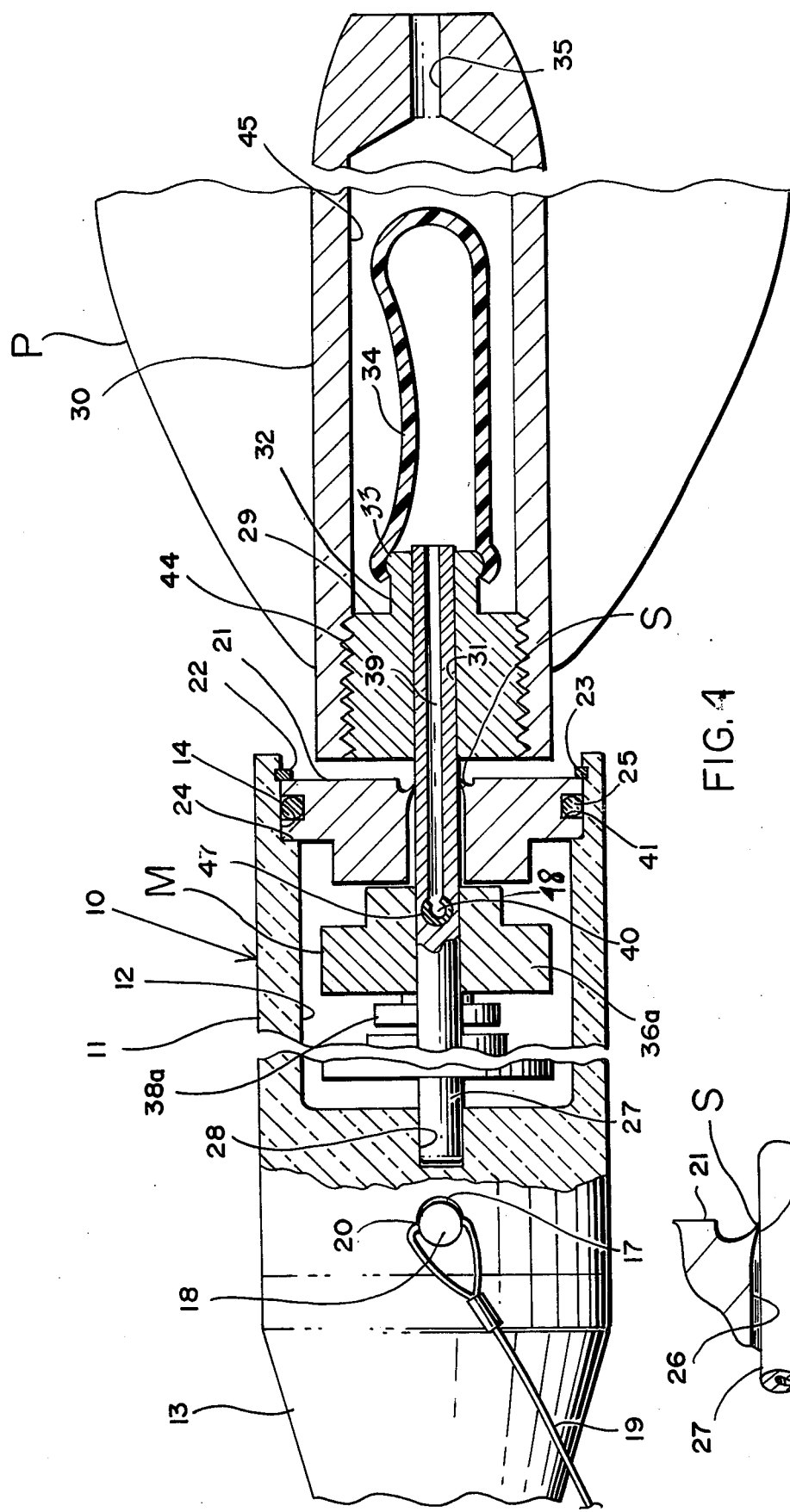
FIG. 4 is a similar view of the water meter rotated 90° about its axis and somewhat enlarged showing the operation of the flexible diaphragm.
Figure 5:
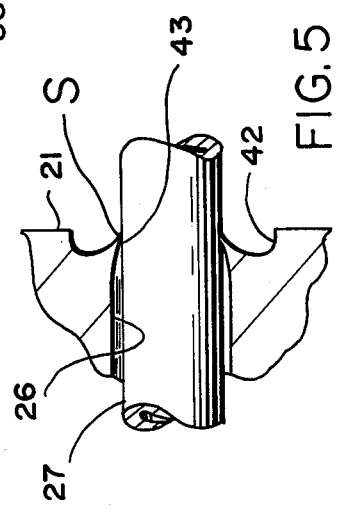
FIG. 5 is a fragmentary and enlarged sectional view of the shaft water seal.

Referring to the drawings wherein like numerals are used to designate similar parts throughout the several views, the numeral 10 refers to my water flow meter consisting of a cylindrical housing 11 having a chamber 12 along its axis with a solid nose portion 13 mounted at one end and an opening 14 at the other end. The housing 11 is provided with a pair of elongated openings 15 parallel to the axis of the housing 11 and symmetrically disposed on each side thereof. The openings 15 are sealed by arcuate transparent members 16 that are cemented to the housing and serve as magnifiers for reading the numerals in all of the counter wheel gears 36 as explained hereinafter. The nose portion 13 is provided with a radially disposed bore 17 through which a rod 18 extends. A towing bridle 19 for towing the water flow meter 10 has its ends secured to the extremities of the rod 18 as at openings 20.

At the rear end of the housing 11, the chamber 12 is enclosed by an end wall or plug 21 and secured thereon by a split ring 22 fitted into a peripheral slot 23 formed on the inside wall of the housing 11 and engaging the outer surface of the plug 21. The inner surface of the plug 21 engages a shoulder 24 formed on the inside surface of the housing 11. The plug 21 is sealed against leakage of oil by means of an O-ring 25 mounted in a peripheral slot 41 formed on the outer surface of the plug 21. At the center of the plug 21 is a bore 26 through which a rotatably and axially mounted shaft 27 extends. The shaft 27 has its forward end rotatably mounted in a blind bore 28 formed in the inner portion of the nose 13, while its rear portion extends beyond the housing 11 and has a bladed propeller P mounted thereon.

The propeller P comprises a base member 29 having threads on which a propeller housing 30 is threadedly mounted as at 44 and an axially disposed bore 26 for receiving the shaft 27 to which the base member 29 is secured as by set screw 46 in order that they both rotate in unison. The base member 29 is provided with a hub portion 32 and an enlarged lip portion 33 for receiving the open end of a flexible diaphragm 34 that is tubular in shape. The flexible diaphragm 34 is positioned in a chamber 45 formed in the propeller housing 30 which is tubular having an opening 35 at the extreme end of the housing 30 to permit the diaphragm 34 to be influenced by atmospheric and sea water temperatures pressures.

Mounted on the shaft 27 within the chamber 12 of the housing 11 is a conventional counter mechanism M consisting of a plurality of counter gear wheels indicated by the numerals 36 mounted on the propeller shaft 27 and Geneva wheels 38 adjacent thereto in order to count the number of revolutions made by the propeller P. As is well known in the art, the first or decade gear 36a which is secured to the shaft 27 will revolve in unison therewith. After the gear 36a has made 10 revolutions, the adjacent Geneva wheel 38a will make a complete revolution to cause the second gear 36b to rotate to the extent of one complete revolution. After the gear 36b has made a complete revolution, its adjacent Geneva wheel 38b will engage the third gear 36c to rotate it to the extent of one-tenth of a complete revolution. In this manner the total revolutions made by the propeller shaft 27 will be recorded. Knowing the time that elapsed during the rotation of the propeller P, one can arrive at the speed of flow of the water causing the rotation of the propeller. It is to be noted that the counting mechanism M is conventional and forms no part of the present invention.

However, the chamber 12 of the housing 11 is normally filled with oil in order to maintain the counter mechanism M thoroughly lubricated.

Oil in the housing 11 is free to flow to and from the chamber 12 and the flexible diaphragm 34 through an axially disposed bore 39 that extends from the flexible member 34 to the first or decade gear 36a, where a transverse bore 40 extends radially in the hub 48 of the gear 36 to connect the bore 39 and the chamber 12.

The plug 21 is provided with a seal S at the juncture of the shaft 27 and the outer surface of the plug 21 formed by undercutting the rear face of the plug 21 as at 42 and leaving a obliquely extending lip or knife edge portion 43 that engages the shaft 27 while the remainder of the bore 26 is slightly larger than the outside diameter of the shaft 27. It is to be noted that water pressure impinging on the knife edge portion 43 that extends about the shaft 27 will tend to cause the knife edge portion to flex in the direction of the shaft 27 and effect a perfect seal to prevent water from seeping therethrough without incurring excessive friction. The surface of the shaft 27 within the confines of the plug 21 will be inundated with oil from the chamber 12.

In the normal use of my water flow meter 10, a line will be connected to the tow bridle 19 and the water flow meter 10 placed over the side and permitted to reach the depth in the water at which the water flow rate is to be recorded. The water flow meter 10 is now subjected to changes in temperature and pressure. Water will enter the propeller housing 30 through the opening 35 to cause the flexible diaphragm 34 to be compressed and oil is made to flow into the chamber 12 of the housing 11 where the large body of oil and any air that might have been trapped therein are present. At the same time, the water pressure bearing against the knife edge or lip 43 will flex it inwardly against the shaft 27 to prevent water from leaking into the housing chamber 12 while permitting the shaft 27 to rotate freely.

Now when the water flow meter 10 is brought up to the surface of the water or when it is subjected to temperature changes, the oil will expand and will flow through from the chamber 12 through the bores 40, 39 and back into the flexible diaphragm 34. During all of the times the oil flows to and from the chamber 12 and the flexible diaphragm 34, there will be no loss of oil while at the same time there is no leakage of water into the housing 11 at the position of the seal S of the plug 21 through which the rotating propeller shaft 27 extends. The lubricating oil contained in my water flow meter 10 will remain therein at all times for all variations of pressure and temperature that the meter may be subjected to and at no time can water seep into the chamber 12 since the increase in pressure of water in which the meter 10 is operating simply increases the force of engagement of the seal S on the rotating shaft 27 and thereby increase the efficiency of the seal.

What I claim as new and desire to secure by Letters Patent is:

1. A water flow meter comprising a housing having an enclosed chamber for containing a fluid, impeller shaft means rotatably mounted on said housing and having one end extending into said chamber, an impeller housing mounted on the other end of said shaft means, said impeller housing having a chamber, an opening in said chamber forming an open chamber, duct means extending along said shaft means from said other end portion to a position within said enclosed chamber, a flexible diaphragm being mounted on said other end portion of said shaft and within said propeller housing whereby fluid in said enclosed chamber may flow into and from said flexible diaphragm upon exposure of said meter to fluctuations in temperature and pressure which effect an expansion and contraction of said fluid in said meter.

2. The structure as recited by claim 1 taken in combination with seal means mounted on said tubular housing and engaging said rotatable shaft means for preventing the leakage of water therein.

3. The structure as recited by claim 2 wherein said tubular housing having a nose portion and a tail portion, said nose portion having a blind bore for receiving said one end portion of said propeller shaft means and a plug secured to said tail portion, said plug having a bore for receiving said shaft means.

4. The structure as recited by claim 3 wherein said seal means comprises a knife edge means extending about said plug bore and engaging said shaft means whereby increased pressure applied on said knife edge means effects a firmer engagement of said knife edge means on said shaft means.

* * * * *